United States Patent [19]

Elings et al.

[11] Patent Number: 5,204,531
[45] Date of Patent: Apr. 20, 1993

[54] METHOD OF ADJUSTING THE SIZE OF THE AREA SCANNED BY A SCANNING PROBE

[75] Inventors: Virgil B. Elings; John A. Gurley, both of Santa Barbara, Calif.

[73] Assignee: Digital Instruments, Inc., Santa Barbara, Calif.

[21] Appl. No.: 835,577

[22] Filed: Feb. 14, 1992

[51] Int. Cl.$^5$ .............................................. H01J 37/00
[52] U.S. Cl. ...................................... 250/306; 250/307
[58] Field of Search ................................ 250/306, 307

[56] References Cited

U.S. PATENT DOCUMENTS

| Re. 33,387 | 10/1990 | Binnig | 250/306 |
|---|---|---|---|
| 4,848,141 | 7/1989 | Oliver et al. | 73/81 |
| 4,889,988 | 12/1989 | Elings et al. | 250/306 |
| 4,939,363 | 7/1990 | Bando et al. | 250/306 |
| 4,942,299 | 7/1990 | Kazmerski | 250/306 |
| 4,945,235 | 7/1990 | Nishioka et al. | 250/306 |
| 4,952,857 | 8/1990 | West et al. | 318/306 |
| 4,954,704 | 9/1990 | Elings et al. | 250/307 |
| 5,047,633 | 9/1991 | Finlan et al. | 250/306 |
| 5,059,793 | 10/1991 | Miyamoto et al. | 250/306 |

Primary Examiner—Jack I. Berman
Assistant Examiner—Kiet T. Nguyen
Attorney, Agent, or Firm—Oblon, Spivak, McClelland, Maier & Neustadt

[57] ABSTRACT

A method of adjusting the scan size of an instrument having piezoelectric scanners, such as a scanning probe microscope, including operating the instrument at a first scan size and adjusting the scan size of the instrument to a second scan size. The instrument is then precycled by scanning in each of x and y directions over substantially maximum excursions in each direction for a number of scan lines less than a complete scan of an area of the second scan size. The precycling settles the sensitivities of the piezoelectric scanners. The instrument is then operated at the second scan size to obtain data indicative of the surface of a scanned object.

27 Claims, 6 Drawing Sheets

METHOD OF ADJUSTING THE SIZE OF THE AREA SCANNED BY A SCANNING PROBE

BACKGROUND OF THE INVENTION

1. Field of the Invention

The present invention relates to instruments having scanning probes, and in particular, to scanning probe microscopes (SPM's) with piezoelectric scanners and the capability to vary the size of the scanned area within the range of the scanner.

2. Discussion of the Background

Instruments that contain scanning probes and require precise control of the probes are becoming increasingly important in research and industry. SPM's are one type of these instruments which provide high resolution information about the properties of surfaces. One common use of SPM's is imaging, and some types of SPM's have the capability of imaging individual atoms. Along with imaging, SPM's can measure a variety of surface properties, with detail over the range from a few angstroms to hundreds of microns. For many applications, SPM's can provide lateral and vertical resolution that is not obtainable from any other type of device.

SPM's operate by scanning a probe, usually some form of very sharp tip, over a surface in a raster scan. The tip interacts with the surface, and this interaction is measured. A variety of interactions can be used, but typically these interactions are confined to a very small area around the tip. For example, the first SPM developed was the scanning tunneling microscope or STM. Such a device is described in U.S. Pat. No. 4,343,993, to Binnio et al. The STM places a sharp, conducting tip near a surface. The surface is biased at a potential relative to the tip. When the tip is brought near the surface, a current will flow in the tip due to the tunneling effect. Tunneling will occur between the atom(s) closest to the surface in the tip and the atoms on the surface. This current is a function of the distance between the tip and the surface, and typically the tip must be within 20 angstroms of the surface for measurable current to be present. STM's require an electrically conducting surface, or an insulated surface coated with a conducting layer.

Another SPM, the atomic force microscope (AFM), similarly scans a tip across a surface. The tip in this case is mounted on a free end of a lever or cantilever, which is fixed at the other end. The tip is brought in contact with a surface, such that the force of interaction of the tip with the surface causes the cantilever to deflect. If the tip exerts a sufficiently small force on the sample, then the interaction can be confined to a very small area. Other interactions between a probe and a surface have been used successfully, such as electric and magnetic field detection, near-field optical effects, and ionic conductance.

SPM's require the capability to measure the interaction between the probe and the tip. In the case of the STM, the currents are easily measurable, on the order of nanoamps. For the AFM, very small deflections must be measured which has been accomplished both with optical techniques, such as beam deflection or interference, and tunneling methods.

SPM's also require a mechanism to scan the tip over the surface in a raster pattern. Ideally, this mechanism should have controllable motions both laterally and vertically to the surface that are of a size to take advantage of the resolution provided by the tip-surface interaction. This mechanism must also be very rigid, as the interactions between tip and surface require extremely high stability. Most SPM's currently use piezoelectric actuators that are constructed to achieve three-axis scanning with very high resolution. The most common type of scanner used for SPM's are piezoelectric materials formed into the shape of a tube. Electrodes are placed on this tube such that longitudinal bending motions constitute the lateral scanning motions, and shortening or lengthening of the tube constitute the vertical scanning motions. These tubes are very rigid. Such scanners have been made with resolution of fractions of an angstrom. Scanners of this type have also been constructed with maximum scan sizes of over 100 microns.

SPM's typically do not operate by using the tip-surface interaction directly to form an image of the surface, but rather control the interaction very closely while scanning the surface. For example, in an STM, the tip-surface separation cannot be allowed to vary because the tunneling current decreases rapidly if the separation increases. In an AFM, the force and therefore the cantilever deflection must be kept low. Therefore SPM's are usually operated in a feedback mode, where, as the sample is scanned laterally in a raster pattern, the sample or tip is adjusted vertically to maintain the measured interaction parameter at a constant, predetermined value. The adjustment information as a function of lateral position forms a topographic map of the scanned surface. The feedback implementation is critical to the operation of an SPM, as high performance feedback systems allow for faster, more accurate imaging.

The ability of piezoelectric materials to produce very small, controlled incremental movements is critical to the operation of SPM's, as no other positioning devices exist with adequate resolution, response time, or controllability. However, piezoelectric materials, although making SPM's possible, do not have ideal characteristics. The actual characteristics of these materials have a significant effect on performance.

Piezoelectric scanners exhibit a motion that is a non-linear function of applied voltage. The inventors have addressed this issue in U.S. Pat. No. 5,051,646 and co-pending application Ser. No. 07/447,851 filed Dec. 8, 1989 whose disclosures are herein incorporated by reference.

Much prior art also exists on the subject of piezoelectric non-linearity. One effect that has not been addressed in the prior art is the sensitivity of the piezoelectric scanner as a function of the applied voltage. Sensitivity in this context is the motion response of the scanner to the applied voltage, usually expressed for SPM scanners in angstroms/volt. This sensitivity number is not constant over the range of applied voltage.

The lateral scanning motions in an SPM create a raster pattern, as illustrated in FIG. 1. FIG. 1 illustratively represents raster scan lines for one scan. A typical scan is comprised of hundreds of scan lines, a scan line being one excursion back and forth in the x-direction. The scanner moves back and forth in one lateral direction, x, at a relatively high rate while the scanner is displaced back and forth in an orthogonal lateral direction, y, at a much lower rate. Thus the scanner repetitively scans a rectangular area. This motion is achieved by applying waveforms shown in FIG. 2 to the corresponding x and y electrodes 32 and 34, respectively on the scanner 30 as illustrated in FIG. 3. Typically, the frequency of the x-direction waveform is hundreds of times higher than that of the y-direction waveform.

Historically, triangular waveforms are applied to achieve the desired motions, similar in function to the triangular waveforms used to create the raster scans in cathode ray terminals or television sets. The inventors have found, however as described in copending application Ser. No. 07/447,851, that non-linear waveforms that compensate for the piezoelectric non linear behavior are preferable, but most SPM's use triangular waveforms.

The waveforms used to drive the scanners may span the entire range of voltage available, and thus create the maximum scan size, or the waveforms may be scaled to be a portion of the total range. In this way the scan size may be changed. In practice, the size may be varied from the maximum down to the smallest size compatible with the electronics used to create the drive waveforms. Prior art SPM's simply scale the drive waveforms to change the scan size.

However as noted above, the sensitivity of the scanner is a nonlinear function of the applied voltage. For a typical scanner used by the inventors, the scan size S may be represented by:

$$S = aV + bV^2 = V(a + bV) \quad (1)$$

where V is the maximum voltage applied, a is the linear sensitivity factor, typically determined experimentally, and b is termed the derating factor and is positive. Higher order terms could also be included for a more accurate model of scanner behavior. Typical values are $a = 2200 \text{Å}/V$ and $b = 3 \text{Å}/V^2$ for a scanner of this type with a maximum scan size of 100 microns.

Thus, when the drive waveforms are scaled, the sensitivity increases as the scan voltage increases. Moreover, the inventors have found that the sensitivity change has a cycle lag, in that when the scan size is changed, the sensitivity does not change immediately to the new value. The inventors have discovered that the time period over which the sensitivity settles is related to the scanning motion, and thus the sensitivity changes at a different rate in the x direction than in the y direction. After a change in scan size, the sensitivity remains at the value for the previous scan size for a few cycles of the scanner. The sensitivity in the x direction settles over a few cycles, while the sensitivity in the y direction also settles in a few cycles but much more slowly because the y motion cycles at a much lower rate.

After several scanning cycles, the sensitivity of the scanner will settle to a steady value. The inventors have found by experience that if the scan size is suddenly changed, the scanner cannot "know" what the new end point of the scan motion will be until that point is actually reached. Thus, the settling process cannot begin until a scan cycle is complete.

This effect causes the substantial distortion and inaccuracies found in existing SPM's when scan sizes are changed. Prior art SPM'S rescale the drive voltages and immediately begin scanning at the new scan size, as shown in FIG. 4A. The prior art SPM operates at a first scan size (step 40) illustrated by the scanning motion shown in FIG. 4B after the scanning sensitivity has settled to a steady value. The scan size changes (step 41) and the SPM immediately begins a new scan at the changed scan size (step 42), providing new scan motions shown in FIGS. 4C–4E. For convenience, the motions are shown where the scan size was changed at the beginning of a new scan. The x sensitivity settles quickly to its new value during the scan, giving a scan motion as shown in FIG. 4C. The y sensitivity settles out over one or more frames, such that during the first frame the x and y sensitivities are very different, giving in general a rectangular scan not a square one (FIG. 4D). This effect then goes away as the scanner is scanned through the frames, as shown in scanning motions 4C–4E, which are in that time order but not necessarily successive frames. In FIG. 4E the sensitivities are settled and the scanner behaves as expected.

In general, for prior art SPM's, the first scan after a change in scan size is too distorted to be useful, and data is not acquired until the second or the third scan, i.e., after both x- and y-direction sensitivities have settled. For large scans of tens to hundreds of microns, the time for the first scan can be as long as several minutes, which can be very inconvenient for all applications and limits the usefulness of SPM's for production-oriented tasks where the speed of accurate data acquisition is very important.

SUMMARY OF THE INVENTION

Accordingly one object of the present invention is to provide a novel method for operating an instrument having a scanning probe with the capability to change the size of the scanned area.

Another object of the present invention is to reduce the amount of distortion due to the sensitivity settling time after scan size is changed.

A further object of the present invention is to provide useful data on the first scan after a change in scan size so as to eliminate the need to wait for a second or later scan to acquire meaningful data.

The foregoing and other objects are achieved by a method of changing the scan size of an instrument with piezoelectric scanners and scan motions in perpendicular x and y directions. The distortion caused by changing the scan size is reduced by adjusting the scan size to a desired size, precycling the instrument in each of the x and y scan motion directions to settle the sensitivities of the scanner at the adjusted scan size, and operating the instrument to scan the adjusted size scan area.

These objects are also achieved by adjusting the scan size to the desired size, precycling the instrument in a scan motion in a direction forming an angle with the x and y axes of the x-y scanning plane to settle the sensitivities of the scanner, and operating the instrument at the adjusted scan size.

The scanning rates for the x- and y-direction precycling are adjustable, desirably by a computer, which can take into account differences in the scan motions in the settling rates of the x and y directions and the change in scan size.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
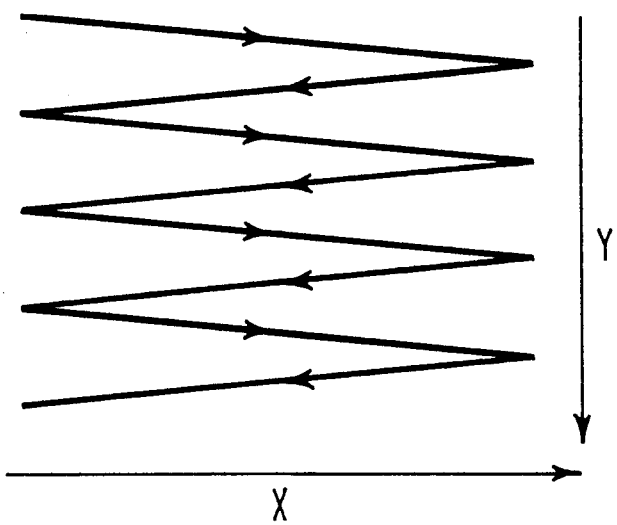
FIG. 1 is an illustration of the conventional pattern typically used for SPM scanning.
Figure 2:
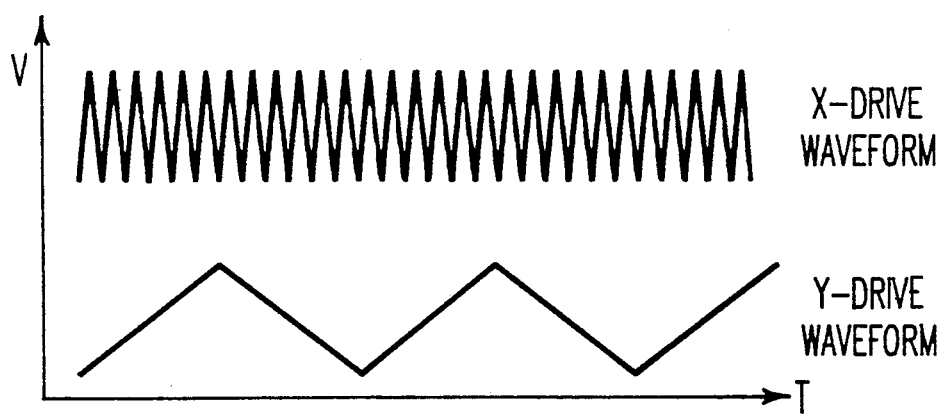
FIG. 2 illustrates x and y drive waveforms used to achieve the scanning pattern shown in FIG. 1.
Figure 3:
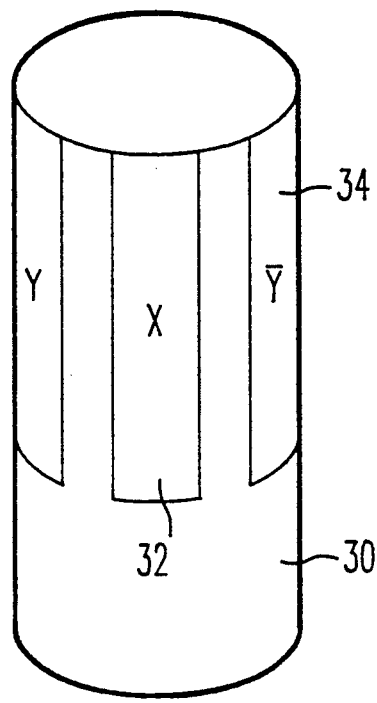
FIG. 3 is an illustration of a piezoelectric scanner with electrodes.
Figure 4A:
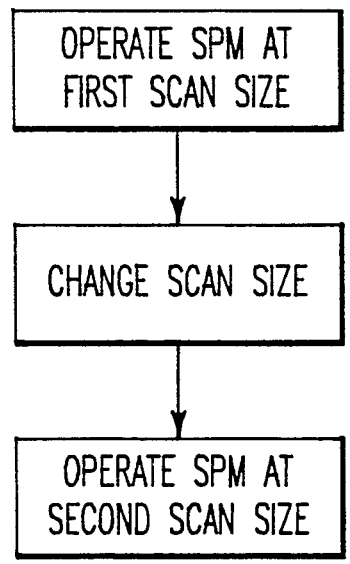
FIGS. 4A–4E illustrate adjustment of scan size of a SPM according to the prior art showing scan distortions.
Figure 4B:
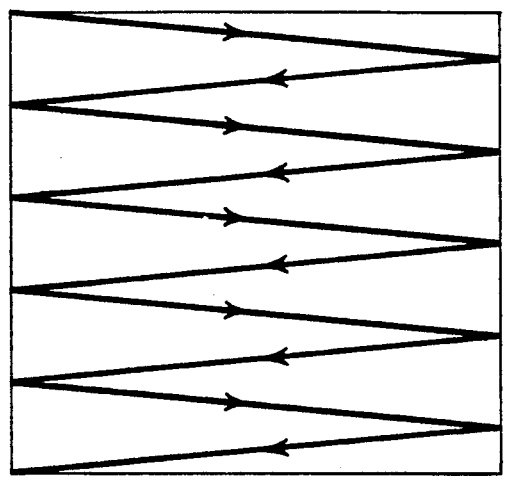
Figure 4C:
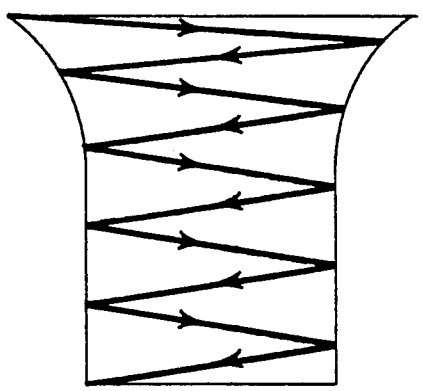
Figure 4D:
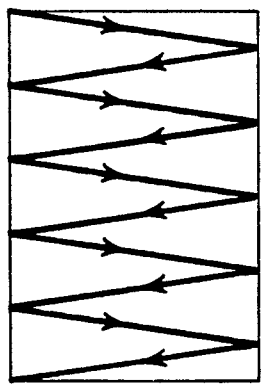
Figure 4E:
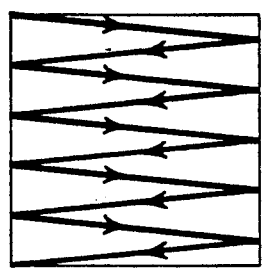
Figure 5:
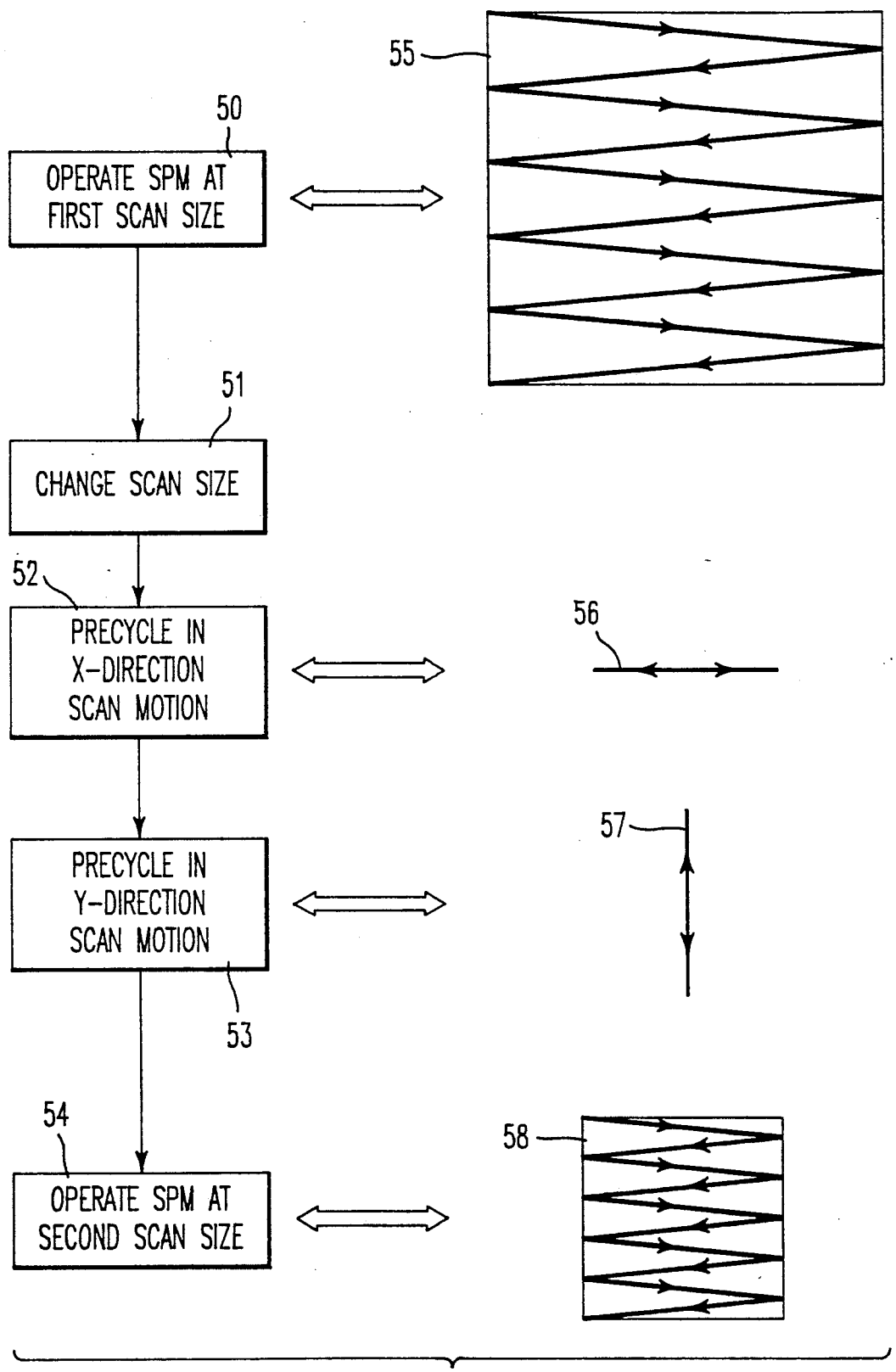
FIG. 5 illustrates adjustment of scan size of a SPM according to a first embodiment of the present invention.

Referring now to the drawings, and more particularly to FIG. 5 thereof, a first embodiment of the present invention is shown. FIG. 5 illustrates a flow chart of the first embodiment with steps 50–54, and the corresponding operations of the SPM scanner shown at 55–58. A scan at a first scan size is cycling at 50, which provides the scan area and scan motions 55 of the SPM probe across a surface under analysis. The operator of the SPM decides to change the scan size to a second size (step 51). The SPM responds to the operator request by scaling the x and y scan drive voltages accordingly. The distance scales are adjusted to the scan size-voltage relationship of the scanner (for example, see the discussion of the background) or by scaling the applied voltage to the relationship. The number of scan lines in the new scan size may be the same as the number of lines in the first scan size. A typical scan is comprised of 100–1000 or more lines, and the range of possible scaling can be as large as $10^5$, but is typically less than 10.

Before imaging the new scan area, the x drive is precycled for a small number of scan lines at the second scan size (step 52 which provides x-direction precycling scan motion 56 as shown in FIG. 5). X-direction precycling consists of displacing the probe at the second scan size in the x direction at a relatively high rate. The relative high scanning rate quickly settles the x-direction sensitivities. It is convenient to use a precycling rate which is the same as the X scan rate. Subsequently, the y drive is precycled for a small number of scan lines at the second scan size (step 53 which provides y-direction precycling scan motion 57 shown in FIG. 5). Y-direction precycling consists of displacing the probe in the y direction at a relatively high rate, rapidly settling the y-direction sensitivities. Thus, the x- and y-precycling are independent motions in this embodiment. The rate at which the probe is displaced in the y direction during y-direction precycling can be comparable to the rate at which the probe is displaced in the x direction during x-direction precycling. Performing the y-direction precycling at a rate comparable to the x-direction precycling rate insures that the sensitivity in y settles quickly. During precycling, the tip can be in the normal operating position vertically or can be raised from the surface and the vertical feedback turned off.

In x- and y-direction precycling scan motions 56 and 57 shown in FIG. 5, the precycling is shown as a single line for illustrative purposes only but actually is at least one scan line traversing the same path. The amount of precycling necessary will be determined by many factors apparent to those of ordinary skill in the art, including the degree of scaling and the amount of distortion which is acceptable at the new scan size.

The inventors have found, for a piezoelectric material such as Vernitron PZT 5H, that most of the sensitivity change occurs in the first cycle, so that even one cycle of precycling is a large advantage over the prior art.

The precycling scan lines preferably undergo an excursion equal to the maximum excursion of the scan line at the new scan size. However, the present invention is not limited to precycling scan lines having a length substantially equal to the maximum x-direction and y-direction excursions during normal scanning, but any excursion in the x- and y-direction precycling scan lines of a length which rapidly settles the sensitivities of the scanners ma be employed.

For instance, if the scan voltage is reduced from an excursion of 100 volts to 10 volts, precycling at 5 volts would settle the sensitivity substantially to its proper value since, as shown by equation (1), the sensitivity at 10 volts and 5 volts is similar. For this example, the precycling would be about half the length of the new scan size.

Another example, if the scan size change from 200V to 5V, precycling at 5V would rapidly settle the sensitivities. Without precycling, the bV term would be 600 rather than 15, which is large compared to 2200 (using $a=2200$ and $b=3$, which are typical values). However, precycling at 1V or 10V would be effective as the bV term would be 3 and 30, respectively, which are both small compared to 2200. Thus, precycling is not limited to the new scan size voltages to be effective. A range of sizes would effectively settle the scanner sensitivities.

The change in sensitivity depends on the voltage change from one scan to another, with large voltage changes giving the large sensitivity changes. Therefore, the precycling procedure can be varied taking into consideration the voltage change. Little or no precycling is required at small voltage changes and a greater amount of precycling is needed as the voltage change increases between old and new scans.

The precycling of the scanner according to the present invention has the effect of causing the sensitivity of the scanner to settle rapidly in both x- and y-direction scan motions. Then the second scan area is imaged, by operating the SPM at the second scan size (step 54), resulting in the second scan motions 58 shown in FIG. 5. The first data scan after precycling is usable, providing accurate data with no or minimal distortion due to unsettled sensitivities. A significant amount of time may be saved in operating an SPM, particularly when performing large scans by the present method of precycling in the x and y directions prior to scanning the new area.

The method of the present invention settles the sensitivities in both directions symmetrically, both sensitivities being fully settled before imaging takes place. Precycling in the x and y directions which consists of one or a few scan lines as illustrated by the precycling scan motions 56 and 57 of FIG. 5 requires a small amount of time and only a small fraction the time needed for the several hundred scan lines that make up a typical image.

As an example, the new scan size is chosen to be 150 μm on a side and the scanning rate is chosen to be 100 microns per second, which is a typical rate over a relatively rough surface. Thus, each scan is approximately 300 microns in length (over and back) which requires approximately 3 seconds to scan. As a typical scan area will require 400 scan lines, scanning over this area will require 1,200 seconds, or 20 minutes. In the case where precycling according to the present invention is performed prior to scanning at the new scan size, one scan line will be scanned in each of the x- and y-directions requiring approximately 6 seconds. It is evident that the precycling according to the present invention provides a considerable time savings through the ability to provide accurate scanning data after only a few seconds compared to the several minutes which are required to complete a typical scan. This time saving advantage is particularly evident when scanning large scan areas requiring large numbers of scan lines or when the SPM is used in a production capacity requiring rapid throughput.

As discussed above, the lag in sensitivity settling is really a cycle lag. Each scanning direction sensitivity settles after one or more scanning cycles. In a typical scan rapidly varying in x and slowing varying in y, one entire frame must be completed before the y direction scanning motion undergoes a complete cycle. On the contrary, the x-direction scanning motion undergoes numerous cycles since a typical scan has hundreds of scan lines. Thus, the method according to the invention can be improved by only precycling in the y-direction. The y-direction only precycling will rapidly settle the y-direction sensitivities while the x-direction sensitivities will settle after a few scan lines of the scan at the new scan size. Thus, the method according to the invention with y-direction precycling only will produce accurate scans with only a few scan lines having some distortion in x, which is acceptable since a typical scan contains hundreds of scan lines.

While the first embodiment is illustrated scaling the first scan size to a smaller second scan size, it is understood that the scaling could be performed such that the second scan size is larger than the first scan size.

The present invention can be most conveniently implemented on an SPM that has the generation of the scan drive waveforms under computer control. A computer controlled system would allow for the invention to be implemented with optimum performance. The rate at which the scanner can be cycled without degrading the sample or the probe depends on the size of the scan and the roughness of the sample terrain. The computer can be easily programmed to adjust the cycling rate for the scan size, and even for the terrain that was encountered on the previous scan, to optimize the cycling rate while minimizing the possibility of tip or sample damage. It is well known that a surface having a smooth topoqraphy may be scanned at a higher rate than a surface with a highly variable topography, such as an integrated circuit. A highly variable topography can be detected by the computer due to the larger feedback variation necessary to maintain the appropriate tip-surface separation, and the scanning rate can be accordingly adjusted, and stored for later reference when changing scan size.

Also, the computer can adjust the scanning rate based upon the new scan size after changing. It may not be desirable to maintain the scan rate of the previous scan size, especially if the magnitude of the change is great or if the desired degree of sensitivity of the acquired data changes significantly.

The operating principles of the SPM can also be applied to precycling. Thus, the computer can select a precycling rate based upon the size of the new scan area, taking into consideration the terrain encountered on the previous scan, to optimize the precycling rate. The simplest approach to the precycling is to scan in the y-direction scan motion at whatever rate has been selected for the x-direction scanning. The x and y precycling rates do not have to be the same, and can be adjusted to take into consideration factors, such as the new scan size and terrain of a previous scan, such that the precycling rates are optimized and tip damage is avoided. Alternatively, the tip could be pulled away from the surface during precycling so that the precycling could occur quickly without any tip-surface interaction which might damage the tip.

Figure 6:
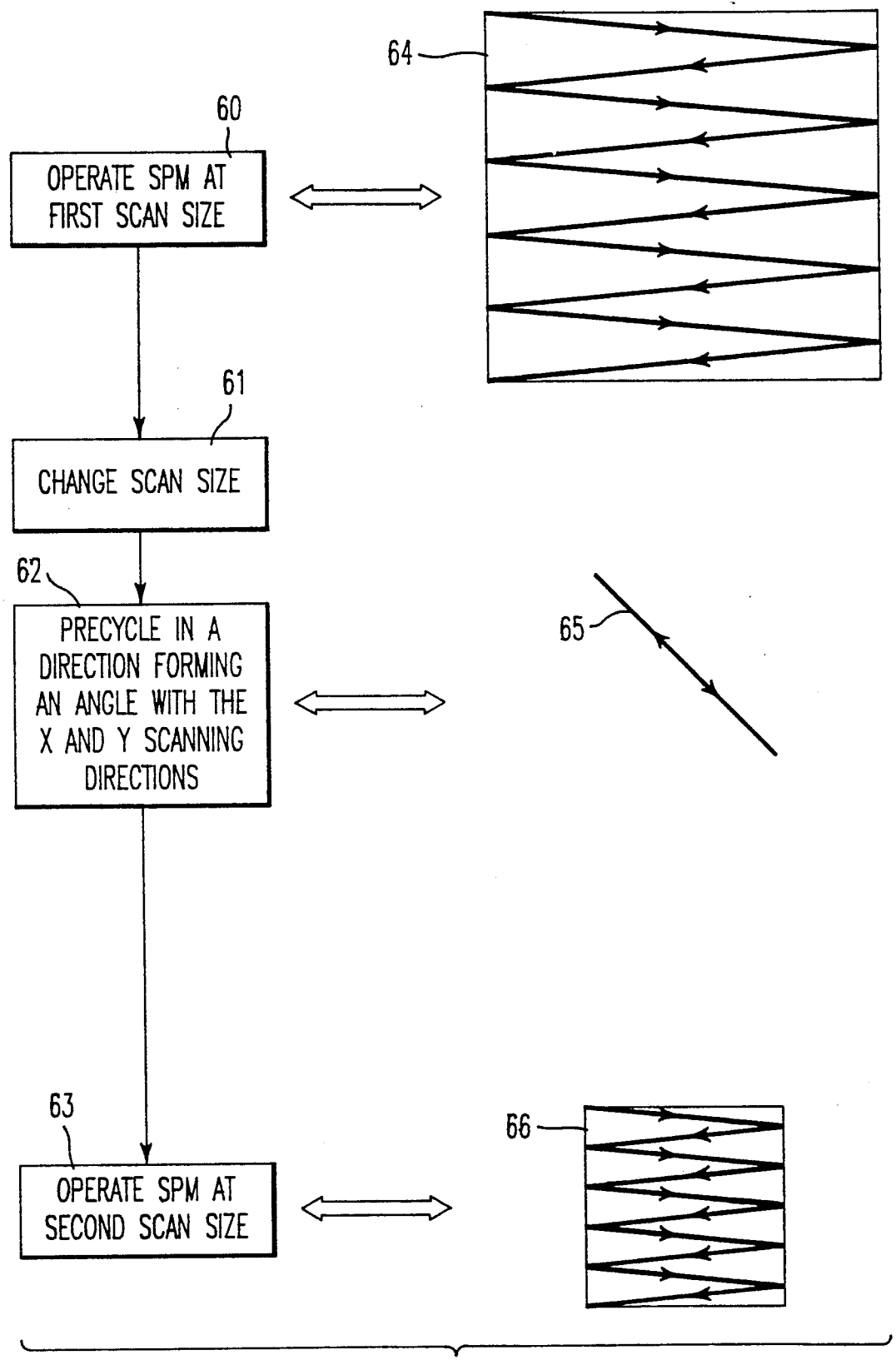
FIG. 6 illustrates adjustment of scan size of a SPM according to a second embodiment of the present invention.

A second embodiment of the present invention is next described in relation to FIG. 6. As in the first embodiment, the SPM is operated at a first scan size (step 60) providing the scanning as shown at 64. The operator initiates a change in scan size (step 61), which is preferably implemented by computer control. This embodiment is illustrated by showing the SPM scanning at an angle in the x-y plane (step 62). The scanning motion 64 is shown in FIG. 5 as 45°. A 45° degree produces a precycling motion that maximizes both the x- and y-direction excursions. However, any angle that traverses a portion of the scan area sufficient to settle both x and y sensitivities can be used. The angle chosen can reflect the degree of scaling (as discussed above) in that the x-direction requires less precycling than the y-direction, and a precycling motion making a larger angle with respect to the x-direction would be preferable. The scanning at an angle preferably traverses substantially an entire diagonal dimension of the new size, but any (length of scan line) which rapidly settles the x and y sensitivities may be employed. Preferably, at least one scan line is scanned, similar to the first embodiment. The precycling settles the sensitivities of the scanner, and the SPM is operated at the second scan size (step 63) providing the scanning motion shown at 66. The second embodiment settles both the x and y sensitivities in a single motion more rapidly executing the precycling than the independent precycling motions of the first embodiment. As in the first embodiment, the initial scan at the second scan size obtains accurate data with minimal distortion due to unsettled sensitivities with a substantial savings in time.

Figure 7:
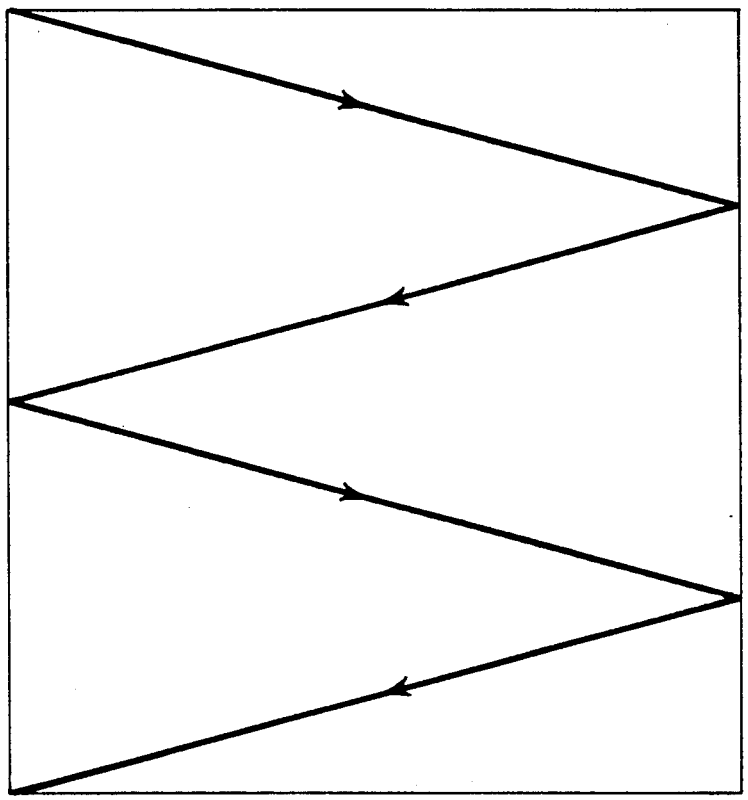
FIG. 7 illustrates a precycling scanning pattern where the x- and y-direction precycling scanning rates are not equal.

Clearly, other precycling patterns could be used that would accomplish the settling. The two embodiments described here are used as examples but are not intended to be limiting as to the general idea of precycling the scan. For example, it is not necessary that the x- and y-direction rates be the same. The precycling in both the x and y directions could be carried out simultaneously, as in the second embodiment, but at different rates resulting in the precycling scanning pattern shown in FIG. 7. As in the previous embodiments, the precycling rapidly settles the sensitivity of the scanners through scanning of a small number of cycles in both the x and y directions. Although several scan lines are shown, as pointed out previously, most of the settling occurs in the first cycle and the actual number of precycling scan lines depends on the actual scanning rates selected.

The embodiments of the invention are directed to scanning probes in a SPM. However, it is to be understood that the present invention is in no way limited to SPM's but is applicable to any instruments containing scanning probes where precise control of the probes is advantageous. For example, a probe may be used to score a surface, by physical contact of the surface with the probe as in an AFM, or by electrical discharge of the probe, induced by a momentary increase in voltage between the probe tip and a grounded surface to generate a controlled ablation of molecular layers of the surface (AFM or a scanning tunnelling microscope). The probe may also be used to manipulate an organic molecule or other microscope organic material with the probe tip (AFM).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method for changing the scan size from a first to a second scan size of an instrument having piezoelectric scanners for scanning a probe over a surface with x-direction and y-direction scan motions, comprising:
    operating said instrument at a first scan size;
    precycling said instrument by scanning said probe in said x and y directions at a scan length related to said second scan size for a number of scan lines but less than a number of scan lines in a full scan; and
    operating said instrument at said second scan size.

2. A method as recited in claim 1, wherein said step of precycling comprises:
    scanning said probe in said x direction at a first rate; and
    scanning said probe in said y direction at a second rate.

3. A method as recited in claim 2, wherein said step of precycling comprises scanning in said x and y directions simultaneously.

4. A method as recited in claim 2, wherein said first and second scanning rates are higher than a y-direction scanning rate used to image an area at said second scan size.

5. A method as recited in claim 2, further comprising determining said first and second scanning rates in accordance with said second scan size.

6. A method as recited in claim 2, further comprising determining said first and second scanning rates in accordance with terrain of a sample encountered in a previous scan.

7. A method as recited in claim 2, wherein said first and second scan rates are equal.

8. A method as recited in claim 1, wherein said step of precycling comprises:
    scanning said probe over substantially an entire x-direction dimension of said second scan size; and
    scanning said probe over substantially an entire y-direction dimension of said second scan size.

9. A method as recited in claim I, wherein said step of precycling comprises scanning said probe in each of said x and y directions for one forward and backward cycle.

10. A method as recited in claim 1, comprising lifting said probe from said surface prior to said precycling step.

11. A method as recited in claim 1, comprising said instrument being a scanning probe microscope.

12. A method for changing the scan size from a first to a second scan size of an instrument having piezoelectric scanners for scanning a probe over a surface with x-direction and y-direction scan motions, said y-direction scan motion being more slowly varying than said x-direction scan motion, comprising:
    operating said instrument at a first scan size;
    precycling said instrument by scanning said probe in said y direction at a scan length related to said second scan size for a number of scan lines but less than a number of scan lines in a full scan; and
    operating said instrument at said second scan size.

13. A method as recited in claim 12, wherein said step of precycling comprises:
    scanning said probe over substantially an entire y-direction dimension of said second scan size.

14. A method as recited in claim 12, wherein said step of precycling comprises scanning said probe in said y direction for one forward and backward cycle.

15. A method as recited in claim 12, comprising lifting said probe from said surface prior to said precycling step.

16. A method as recited in claim 12, wherein a y-direction precycling scanning rate is higher than a y-direction scanning rate used to image an area at said second scan size.

17. A method as recited in claim 12, further comprising determining said y-direction scanning rate in accordance with said second scan size.

18. A method as recited in claim 12, comprising said instrument being a scanning probe microscope.

19. A method for changing the scan size from a first scan size to a second scan size of an instrument having piezoelectric scanners for scanning a probe over a surface with and perpendicular x-direction and y-direction scan motions, comprising:
    operating said instrument at a first scan size;
    precycling said instrument in a scanning motion for a plurality of scan lines less than a number of scan lines in a full scan, said x- and y-direction scanning motions being carried out simultaneously; and
    operating said instrument at said second scan size.

20. A method as recited in claim 19, wherein said step of precycling comprises scanning said probe over substantially an entire diagonal dimension of said second scan size.

21. A method as recited in claim 19, wherein a scanning rate during said precycling step is higher than a y-direction scanning rate used to image an area at said second scan size.

22. A method as recited in claim 19, further comprising determining a precycling scanning rate in accordance with said second scan size.

23. A method as recited in claim 19, further comprising determining a precycling scanning rate in accordance with terrain of a sample encountered in a previous scan.

24. A method as recited in claim 19, wherein said step of precycling comprises precycling in a scanning motion having a direction at an angle with respect to said x- and y-direction scan motions.

25. A method as recited in claim 24, wherein said angle is 45°.

26. A method as recited in claim 19, comprising lifting said probe from said surface prior to said precycling step.

27. A method as recited in claim 19, comprising said instrument being a scanning probe microscope.

* * * * *